Nov. 5, 1935.   S. E. SHEPPARD ET AL   2,019,737
SENSITIVE PHOTOGRAPHIC MATERIAL
Filed May 18, 1934
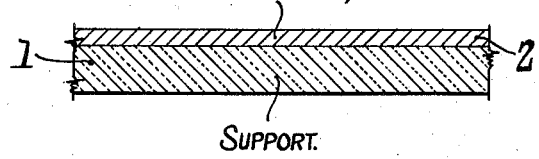
Sensitive Layer Including An Ortho-Arsenite
(Cadmium, Mercuric, Mercurous, Nickelous, Silver, Thallous, Thorium
Or Stannic.)
Support.
Inventors:
Samuel E. Sheppard &
Waldemar Vanselow,
By Newton A. Perrins
Attorney.

Patented Nov. 5, 1935

2,019,737

UNITED STATES PATENT OFFICE 2,019,737

SENSITIVE PHOTOGRAPHIC MATERIAL

Samuel E. Sheppard and Waldemar Vanselow, Rochester, N. Y., assignors to Eastman Kodak Company, Rochester, N. Y., a corporation of New York Application May 18, 1934, Serial No. 726,348

5 Claims. (Cl. 95—7)

This invention relates to photographic elements and particularly to such elements containing in a suitable colloid carrier certain ortho-arsenites as light-sensitive compounds.

It has been known that certain aresenites have light sensitive properties and hypothetical or prophetic statements have appeared in the literature implying that arsenites in general have light-sensitive properties.

We have conducted extensive investigations with these compounds and we have been able to discover such properties in only a few and these do not constitute a group that can be exclusively or accurately classified by any familiar classification according to their chemical structures. We have discovered that certain metal ortho-arsenites do have useful photo-sensitive properties, yielding either a visible image on exposure, particularly to ultra-violet light, or being photo thermographic, or both, and this application relates to this group as hereafter exactly defined.

The term "photothermographic" is herein used as defined in our application, Serial No. 501,663, filed December 11, 1930, matured into Patent No. 1,976,302, to denote the property of a material, after exposure to light, of decomposition or modification under the influence of heat differentially in accordance with the exposure.

In general the photographic element comprises a colloid carrier containing the metal ortho-arsenite and coated upon a suitable support such as metal, glass or paper. The colloid carrier may be gelatine but when the heat necessary to develop an image is high a colloid capable of withstanding it must be used, such as a condensation product of formaldehyde and phenol. (A well known product of this type is sold under the trade-mark Bakelite and has been found satisfactory.)

The properties and method of preparation of the particular compounds found to be useful will now be specifically described.

1. Cadmium ortho-arsenite, $Cd_3(AsO_3)_2$, is white in color and is obtained by adding a solution of cadmium nitrate to an excess of the potassium ortho-arsenite. Cadmium-ortho-arsenite yields print-out images after exposure to ultra-violet light. It does not show photothermographic properties at low temperatures but does when heated over a Bunsen burner.

2. Mercuric ortho-arsenite, $Hg_3(AsO_3)_2$, is white and is obtained when a solution of mercuric nitrate is added to one of potassium ortho-arsenite.

3. Mercurous ortho-arsenite, $Hg_3AsO_3$, is yellow in color and is prepared according to a method given in Mellor's Inorganic Chemistry, Vol. IX, p. 127. It is prepared by adding a solution of arsenic trioxide in 50% alcohol to an aqueous solution of mercurous nitrate acidified with a few drops of nitric acid; and mixed with alcohol until it just begins to appear turbid. The product can be dried at 100° C. The mercuric and mercurous ortho-arsenites yield print-out images after exposure to ultra-violet light but have only slight photothermographic properties at 125° C. or at higher temperatures.

4. Nickelous ortho-arsenite, $Ni_3(AsO_3)_2$, is green in color and was prepared by treating a solution of an excess of potassium ortho-arsenite with a solution of nickelous nitrate. This has slight photothermographic properties only when submitted to high temperatures, as over a Bunsen burner.

5. Silver ortho-arsenite, $Ag_3AsO_3$, is yellow and was obtained by adding equivalent amount of aqueous silver nitrate to an aqueous solution of sodium arsenite, $Na_2HAsO_3$. This has by far the most pronounced photosensitive properties, yielding a visible image readily on exposure to ultra-violet light and exhibiting photothermographic properties at relatively low temperature, as well as at elevated temperatures.

6. Stannic ortho-arsenite, $Sn_3(AsO_3)_4.5-1/2$ $H_2O$ may be obtained by adding an aqueous solution of arsenic trioxide to an aqueous solution of stannic acid containing about an equal amount of sodium chloride. The compound is white in color. This exhibits photothermographic properties at 200° C.

7. Thallous ortho-arsenite, $Tl_3AsO_3$, is yellow. In this case a slight excess of thallous nitrate in water was added to an aqueous solution of potassium ortho-arsenite. This yields a visible image on exposure to ultra-violet light and exhibits only slight photothermographic properties and only at a high temperature.

8. Thorium ortho-arsenite, $Th_3(AsO_3)_4$, is obtained by adding a slight excess of thorium nitrate to potassium ortho-arsenite. The product is white. This exhibits only slight photothermographic properties and then only at a high temperature.

In general, the preferred method of preparation of a sensitive layer is as follows:

A finely powdered ortho-arsenite, prepared as described, is usually mixed in with a 5% gelatin solution, and for the attainment of better dispersion and uniformity the suspension may be run through a so-called colloid mill. In other cases the powder may be sprinkled uniformly over a suitable base, such as glass, which has been freshly coated with a carrier such as bakelite. In certain cases, for example, with silver or thallous ortho-arsenite, the mixture may be prepared by precipitation in a gelatin solution as in the preparation of silver halide emulsions.

It is further to be noted that, while the eight salts noted have sensitive properties to a varying extent, only five are sensititve to ultra-violet light.

In the accompanying drawing is shown on an enlarged scale in section a photographic element having a support 1, and sensitive layer 2 including one of the salts mentioned.

Having thus described our invention, what we claim as new and desire to be secured by Letters Patent of the United States is:

1. A photographic material comprising a colloid carrier and a light sensitive material therein, the light sensitive material being one of the following metal ortho-arsenites: cadmium, mercuric, mercurous, nickelous, silver, thallous, tetravalent thorium and stannic.

2. A photographic material capable of yielding a visible image upon exposure to ultra-violet light and comprising a colloid carrier and a light sensitive material therein, the light sensitive material being one of the following metal ortho-arsenites: cadmium, mercuric, mercurous, silver and thallous.

3. A photographic element comprising a support and a sensitive layer thereon, the sensitive layer comprising a colloid carrier and a light sensitive material therein, the light sensitive material being one of the following metal ortho-arsenites: cadmium, mercuric, mercurous, nickelous, silver, thallous, tetravalent thorium and stannic.

4. A photographic element comprising a support and a sensitive layer thereon, the layer comprising a colloid carrier and silver ortho-arsenite.

5. A photograhic material comprising a colloid carrier and silver ortho-arsenite.

SAMUEL E. SHEPPARD.
WALDEMAR VANSELOW.